US012535639B1

(12) United States Patent
Shen et al.

(10) Patent No.: US 12,535,639 B1
(45) Date of Patent: Jan. 27, 2026

(54) OPTICAL MUX/DEMUX ASSEMBLY (71) Applicant: Twinstar Technologies Co. Ltd., Shanghai (CN)

(72) Inventors: Jinxi Shen, San Ramon, CA (US); Wei Hou, Shanghai (CN); Bin Xu, Shanghai (CN)

(73) Assignee: Twinstar Technologies Co. Ltd., Shanghai (CN)

( * ) Notice: Subject to any disclaimer, the term of this patent is extended or adjusted under 35 U.S.C. 154(b) by 0 days.

(21) Appl. No.: 19/083,292

(22) Filed: Mar. 18, 2025

(30) Foreign Application Priority Data

Feb. 13, 2025 (CN) .......................... 202510162993.0

(51) Int. Cl.
*G02B 6/12* (2006.01)
*G02B 6/293* (2006.01)

(52) U.S. Cl.
CPC ....... *G02B 6/29367* (2013.01); *G02B 6/2938* (2013.01); *G02B 2006/12164* (2013.01)

(58) Field of Classification Search
CPC .............. G02B 6/29367; G02B 6/2938; G02B 2006/12164
See application file for complete search history.

(56) References Cited

U.S. PATENT DOCUMENTS

| 5,859,717 | A | 1/1999 | Scobey et al. |
| 7,349,602 | B2* | 3/2008 | Panotopoulos ...... G02B 6/2938 385/47 |
| 8,488,244 | B1 | 7/2013 | Li et al. |
| 8,538,210 | B2 | 9/2013 | Wang et al. |
| 9,401,773 | B1 | 7/2016 | Gui et al. |
| 9,772,449 | B2* | 9/2017 | Sugama ................. G02B 6/428 |
| 9,983,357 | B2* | 5/2018 | Miyata ............... G02B 6/29367 |
| 9,989,706 | B2* | 6/2018 | Yue ..................... H04J 14/0202 |
| 10,313,045 | B2 | 6/2019 | Xiao et al. |
| 10,551,569 | B2* | 2/2020 | Gui .................... G02B 6/29365 |
| 10,795,087 | B2 | 10/2020 | Kim et al. |
| 11,347,003 | B2 | 5/2022 | Schlepple et al. |
| 2004/0005115 | A1* | 1/2004 | Luo .................... G02B 6/29383 385/47 |
| 2013/0343699 | A1* | 12/2013 | Margalit ............ G02B 6/29367 385/18 |

(Continued)

FOREIGN PATENT DOCUMENTS

CN 111751931 10/2020
CN 114895407 A * 8/2022 ......... G02B 6/29395

*Primary Examiner* — Ryan A Lepisto
(74) *Attorney, Agent, or Firm* — Mestechkin Law Group P.C.

(57) ABSTRACT

An optical assembly for demultiplexing wavelength channels includes a retro-reflecting Z-block of optically transmissive material having a port facing face and a back face. An optical port assembly including an array of channel ports and a common port is proximate to the port facing face. An array of optical filters is located along the port facing face in an optical alignment with respective optical ports. The filters are configured to selectively transmit light of corresponding wavelength channels. The back face of the retro-reflecting Z-block includes a main reflective surface between first and second angled reflective surfaces. The first and second angled reflective surfaces together form a retroreflector for light entering the retro-reflective Z-block via the common optical port.

16 Claims, 8 Drawing Sheets (56) References Cited

U.S. PATENT DOCUMENTS

| | | | |
|---|---|---|---|
| 2016/0187585 A1* | 6/2016 | Yue | G02B 6/2938 385/24 |
| 2017/0329087 A1* | 11/2017 | Huh | G02B 6/29367 |
| 2020/0159034 A1 | 5/2020 | Du et al. | |
| 2022/0252789 A1 | 8/2022 | Schlepple et al. | |
| 2022/0390676 A1 | 12/2022 | Watte et al. | |

* cited by examiner

OPTICAL MUX/DEMUX ASSEMBLY

REFERENCE TO RELATED APPLICATION

This application claims the benefit of Chinese Patent Application No. 2025101629930 filed Feb. 13, 20253, the entire contents of which is incorporated herein by reference.

TECHNICAL FIELD

The present disclosure generally relates to optical communication systems and components thereof, and more particularly relates to optical multiplexers and demultiplexers.

BACKGROUND

Optical data communication and processing systems using wavelength division multiplexing (WDM) require optical multiplexing and demultiplexing ("Mux/DeMux") devices that may be integrated with optical transceiver modules. Space limitations inside an optical transceiver module necessitate a Mux/DeMux device having a small footprint. Known optical Mux/DeMux devices include spectrally selective structures implemented in photonic integrated circuits (PIC), such as array waveguide gratings (AWG), and bulk-optics devices using free-space beam splitters and filters. Mux/DeMux devices including free-space optics typically have lower optical loss, but a larger footprint.

SUMMARY

An aspect of the present disclosure provides an optical assembly for demultiplexing wavelength channels. The optical assembly comprises an optical port assembly comprising an array of optical ports. The optical assembly further comprises a retro-reflecting Z-block ("RRZ block") of optically transmissive material comprising a port facing face and a back face, and an array of optical filters located along the port facing face in an optical alignment with respective ones of the optical ports. The optical filters are configured to selectively transmit light of corresponding wavelength channels. The back face of the RRZ block comprises a main reflective surface between first and second angled reflective surfaces, said first and second angled reflective surfaces together forming a retroreflector for light entering the RRZ block via one of the optical ports.

A related aspect of the present disclosure provides an optical assembly for demultiplexing wavelength channels, the optical assembly comprising an RRZ block of optically transmissive material, the RRZ block comprising a port facing face and a back face. The optical assembly further comprises an array of thin-film optical filters sequentially disposed upon the port facing face for receiving light from an array of optical ports positioned proximate to the port-receiving face, wherein the thin-film optical filters are configured to selectively transmit light of corresponding wavelength channels. The back face of the RRZ block comprises a main reflective surface between first and second angled reflective surfaces, said first and second angled reflective surfaces together forming a retroreflector.

A related aspect of the present disclosure provides an optical assembly for wavelength demultiplexing. The optical assembly comprises a lens array, an RRZ block of optically transmissive material, and an array of optical filters. The RRZ block comprises a first surface facing the lens array and a main reflective surface opposite the first surface. The array of optical filters is located along the first surface, the first surface being at least partially optically transmissive. The optical filters are configured to pass through light of corresponding wavelength channels. The lens array comprises a common-port microlens and a plurality of channel-port microlenses, the channel-port microlenses being optically aligned with respective ones of the optical filters. The RRZ block is tilted relative to the lens array and has a pair of angled reflective surfaces located at opposite sides of the main reflective surface, said pair of angled reflective surfaces together forming a folding reflector for light entering the RRZ block via the common-port microlens.

BRIEF DESCRIPTION OF THE DRAWINGS

Example embodiments disclosed herein will be described in greater detail with reference to the accompanying drawings, which are not to scale, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present disclosure. However, it will be apparent to one skilled in the art that the present disclosure may be practiced in other embodiments that depart from these specific details. In other instances, detailed descriptions of well-known methods, devices, and circuits may be omitted so as not to obscure the description of the present disclosure. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

Note that as used herein, the terms "first", "second" and so forth are not intended to imply sequential ordering but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise.

Figure 1:
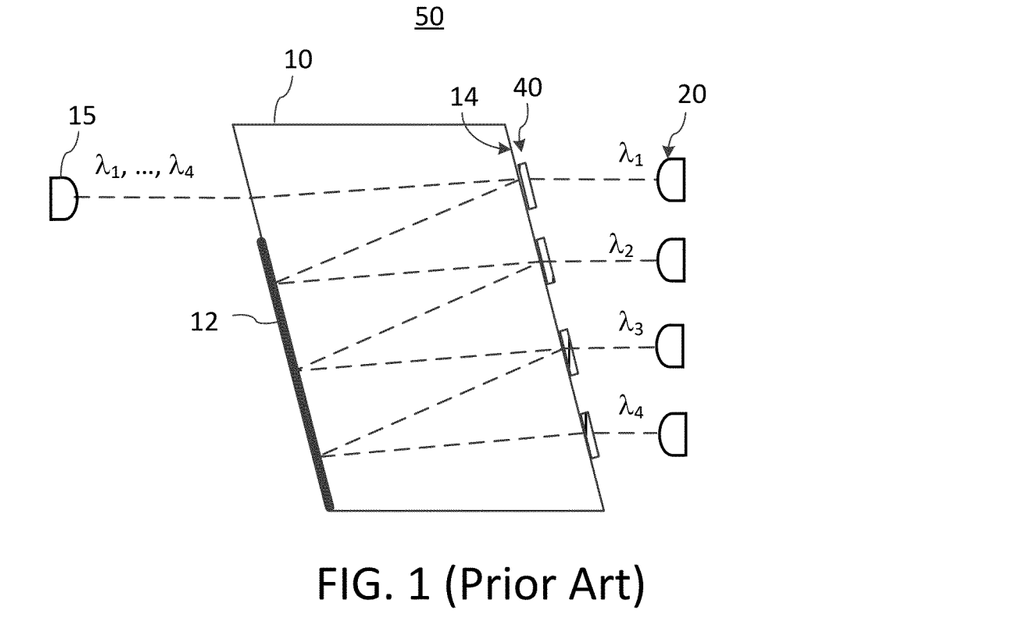
FIG. 1 is a schematic diagram illustrating a prior-art optical demultiplexer using a tilted glass block.

FIG. 1 shows a schematic side view of a prior-art 4-channel optical demultiplexer (DeMux) 50 that is capable of multiplexing or demultiplexing four optical wavelength channels according to their respective wavelengths. The WDM device 50 includes a glass block 10 having a reflective coating 12 at one face thereof, a filter array 40 at a second, opposing face 14 of the block, and a lens array 20. The operation of the device 50 as a demultiplexer may be described as follows. Light entering the glass block 10 from a common port 15, e.g., a collimator, travels within the block in a zig-zag fashion, successively bouncing off the two faces. Individual filters of the filter array 40 are located at the "bounce" points and are configured to selectively transmit one of the four wavelength channels and to reflect the other three wavelength channels. The transmitted wavelength is directed to a corresponding channel collimator. The reflected wavelengths continue propagating to the next filter, where light of another wavelength channel is transmitted out of the block and light of remaining wavelength channels is reflected to propagate to subsequent filters. After multiple bounces within the block 10, multiple wavelength channels are dropped out. The device can also be used as a multiplexer (Mux) with the common port 15 outputting a light beam comprising wavelengths added via the individual filters of the filter array 40. Because light in the glass block 10 travels in a zig-zag fashion, the glass block 10 is also known in the art as a Z-block.

Figure 2:
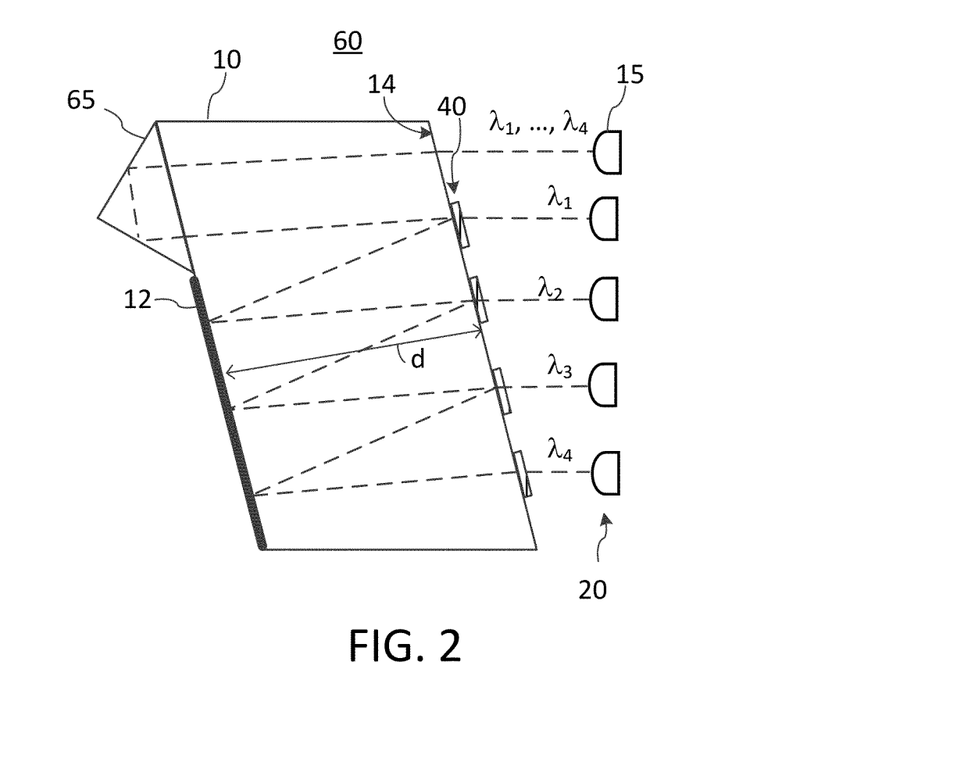
FIG. 2 is a schematic diagram illustrating a modification of the optical demultiplexer of FIG. 1 with an added retroreflector prism.

In the WDM device 50, the common port 15 and the channel ports 20 are at opposite sides of the Z-block 10, which complicates the use of the device in small optical modules, such as e.g. Quad Small Form-factor Pluggable (QSFP) optical modules and the like. FIG. 2 shows an optical demultiplexer 60, which differs from the optical demultiplexer 50 by the addition of a retro-reflecting triangular glass prism 65 at the back face of the glass block 10, which allows positioning of the common port 15 and the channel ports 20 at the same side of the Z-block 10. However, this arrangement increases the depth of the device, as the thickness d of the Z-block 10, i.e. the distance between the light-reflecting faces thereof 12, 14 is typically controlled by the wavelength selectivity requirements.

Examples described below relate to an optical demultiplexing assembly that employs a retro-reflecting Z block ("RRZ block") that enables locating all optical ports at the same side thereof without substantially increasing the depth of the device. To facilitate understanding, the example optical assemblies of the present disclosure and elements or variants thereof may be described with reference to a Cartesian coordinate system (x,y,z) 11 (FIGS. 3-12) having the (x,y) plane parallel to a plane of light propagation, with the x-axis directed along input/output light paths of the device.

Figure 3:
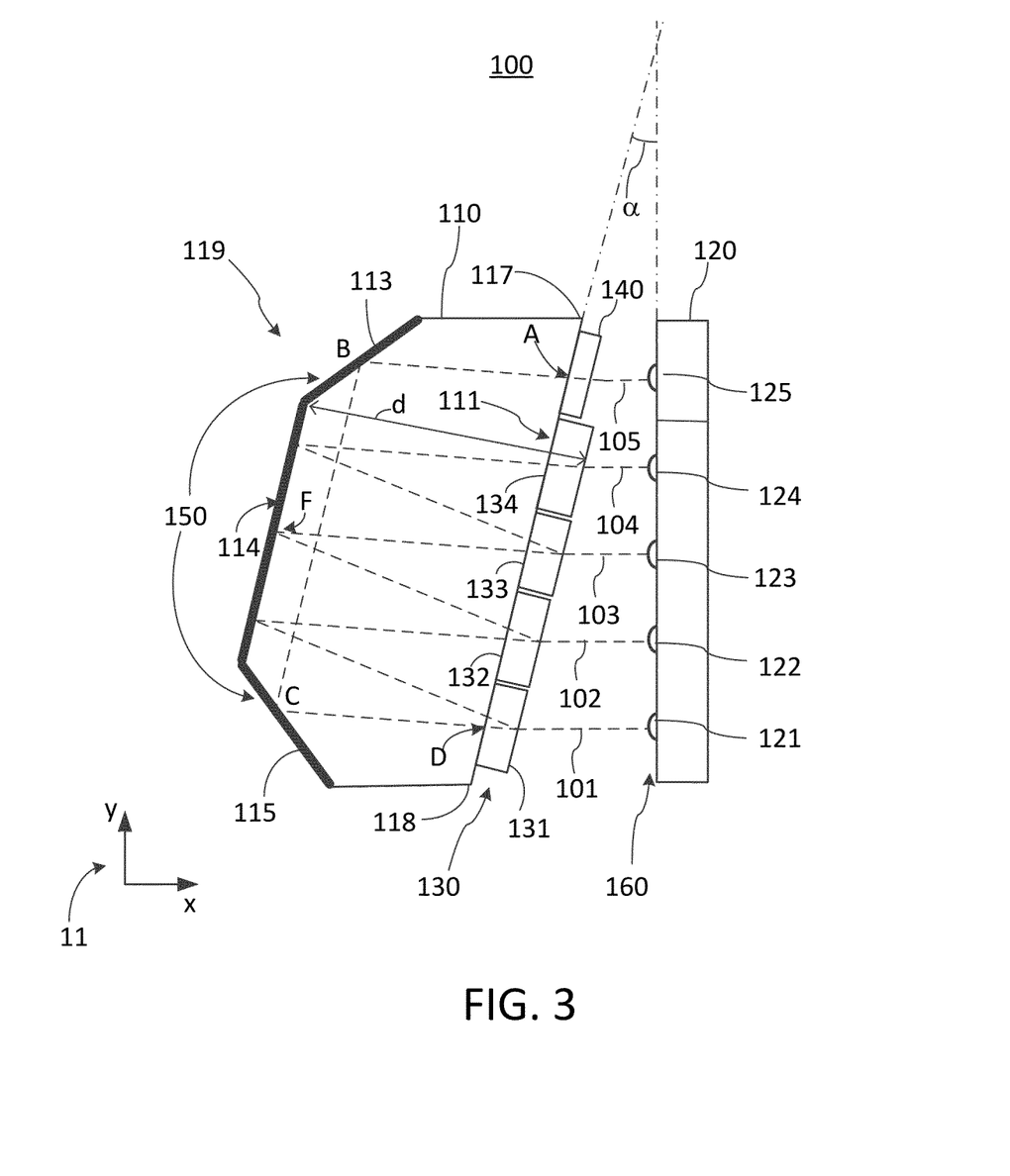
FIG. 3 is a schematic diagram illustrating a demultiplexing optical assembly using a retro-reflecting Z block ("RRZ block") according to an example embodiment.

FIG. 3 shows a schematic plan view of an optical assembly 100 for wavelength demultiplexing according to an embodiment of the present disclosure. The dashed lines show light paths in the optical assembly 100. The optical assembly 100 includes a retro-reflecting Z-block 110 ("RRZ block 110") of optically transmissive material and a filter array 130. An optical port assembly 120 including an array 160 of optical ports 121 to 125 may also be provided. In a preferred embodiment the material of the RRZ block 110 is optically transparent, e.g., glass. The terms "optically transmissive" and "optically transparent" here mean transmissive or transparent, respectively, for light in a wavelengths range of operation of the optical assembly 100, which may be in the infra-red, visible, or ultra-violet ranges of the optical spectrum. E.g., materials that may be used for the RRZ block 110 may include materials other than glass, such as but not limited to silicon, which is transparent in the near-infrared and middle-infrared regions of optical spectrum. The RRZ block 110 has a first face 111, and a back face 119 that comprises a main reflective surface 114 between a pair of angled reflective surfaces 113 and 115. The first face 111, which is at least partially optically transmissive, faces the optical port assembly 120 and may also be referred to herein as the port facing face 111. The main reflective surface 114 and the pair of angled reflective surfaces 113 and 115 may comprise reflective coatings on corresponding parts of the back face 119. In an example embodiment the port facing face 111 is planar and may be parallel to the main reflective surface 114. The filter array 130 is located along the port facing face 111, e.g. with individual filters of the filter array 130 disposed in sequence adjacent to the port facing face 111, affixed to, or integrated with, the RRZ block 110. In an example implementation, individual optical filters 131, 132, 133, and 134 of the filter array 130 are thin-film filters sequentially disposed upon the port facing face 111. The optical port assembly 120 may be located proximate to the port-facing face 111 of the RRZ block 110, e.g. with a gap between the RRZ block 110 and the optical port 125 closest thereto preferably not exceeding 5 mm. The RRZ block 110 may be tilted by an angle $\alpha_{tilt}$ relative to the optical port assembly 120. By way of example, the tilt angel $\alpha_{tilt}$ may be 8 to 20 degrees, or preferably 10 to 15 degrees, e.g. about 13.5°. Further by way of example, the filter array 130 and the array of optical ports of the port assembly 120 may have the same pitch in a range, e.g., from 250 to 1000 μm, or typically 730 to 770 μm, e.g. about 750μ. The depth d of the RZZ block 110 including the filters 131-134 maybe, e.g., in a range from 0.8 to 3.3 mm, or in a range from 2 to 3 mm, e.g., about 2.5 mm in an example implementation. According to a feature of the present disclosure, the pair of angled reflective surfaces 113, 115 at opposite sides of the main reflective surface 114 are angled toward each other, such that together the pair of angled reflective surfaces 113, 115 form a folding reflector 150 and make the RRZ block 110 retro-reflecting.

Generally, the number of different optical filters in the filter array 130 may be equal to the number N of different wavelength channels to be processed, i.e. multiplexed and/or demultiplexed, by the optical assembly 100. In the embodiment illustrated in FIG. 3, the optical assembly 100 is configured to multiplex or demultiplex N=4 non-overlapping wavelength channels centered at four different wavelengths denoted herein $\lambda_1$, $\lambda_2$, $\lambda_3$, and $\lambda_4$. In the following, each of the wavelength channels may be referred to by the corresponding center wavelength, e.g. as the channels $\lambda_1$, $\lambda_2$, $\lambda_3$, and $\lambda_4$, respectively. The filter array 130 thus includes N=4 optical filters 131, 132, 133, and 134, each of which configured to transmit light of a corresponding one of the four wavelength channels $\lambda_1$, $\lambda_2$, $\lambda_3$, and $\lambda_4$, and reflect light of the other three of the four wavelength channels. By way of example, filter 131 may be configured to transmit channel $\lambda_1$ and reflect channels $\lambda_2$, $\lambda_3$, and $\lambda_4$, filter 132 may be configured to transmit light of channel $\lambda_2$ and reflect at least light of the channels $\lambda_1$, $\lambda_3$, and $\lambda_4$, filter 133 may be configured to transmit channel $\lambda_3$ and reflect at least the channels $\lambda_1$, $\lambda_2$, and $\lambda_4$, and filter 134 may be configured to transmit the channel $\lambda_4$ and reflect the channels $\lambda_1$, $\lambda_2$, and $\lambda_3$.

The optical port assembly 120 includes an array 160 of at least N optical ports, e.g., 121-124, which are in optical alignment with corresponding optical filters, e.g., 131-134, of the filter array 130, and which may be referred to as the channel ports 121-124. The optical port assembly 120 may also include at least one common port, e.g., 125. The common port 125 may be disposed to be in optical alignment with the first angled reflective surface 113. The common port 125 may be integrated with the channel ports 121-124, but may also be separable therefrom, e.g., movable at calibration to allow for individual alignment relative to the RRZ block 110. In an example embodiment, the optical ports 121-125 may each be a microlens, and the optical port assembly 120 may be implemented as a lens array or may include a lens array.

The pair of angled reflective surfaces 113, 115 of the RRZ block 110 together operate as a retroreflector (retroreflector 150), and enable having all optical ports 121 to 125 of the optical assembly 100 at the same side without the use of an additional depth-increasing retroreflecting prism. The angled reflective surfaces 113 and 115 are angled toward each other so as to direct multiplexed light beam 105 entering the RRZ block 110 along a twice-folded path A-B-C-D, from a location "A" between a first end of the filter array 130 and a first edge 117 of the RRZ block 110 to a location "D" at the other end of the filter array 130, near an opposite edge 118 of the RRZ block 110.

When the optical assembly 100 operates as a wavelength multiplexer, the common port 125 projects the multiplexed light beam 105, which may comprise light of the channels $\lambda_1$, $\lambda_2$, $\lambda_3$, and $\lambda_4$, onto the first angled reflective surface 113 at the back face 119 of the RRZ block 110 via an optional anti-reflection (AR) coating 140 located near the first end of the filter array 130 (first optical filter 134). The first angled reflective surface 113 folds the light beam 105 by an angle somewhat greater than 90°, e.g., by approximately 98.9° in an example of a glass RRZ block and a tilt angle of 13.5°, to travel along the main reflective surface 114 at some distance therefrom toward the second angled reflective surface 115. The second reflective surface 115 folds the beam by an angle somewhat smaller than 90°, e.g., by approximately 81.1° in the same example, directing the beam toward the optical filter 131 located at an opposite edge of the filter array 130 from the optical filter 134 near the entrance point "A" of the multiplexed beam 105. The filter 131 may transmit, e.g., channel $\lambda_1$ toward the channel port 121 and reflect channels $\lambda_2$, $\lambda_3$, and $\lambda_4$ toward the main reflective surface 114. The reflected light may bounce off the main reflective surface 114 successively impinging the port facing face 111 at locations of the optical filters 132-134. The optical filters selectively allow light of corresponding wavelength channels exit the RRZ block 110 toward respective channel ports 122, 123, or 124, and reflect filtered light portions back toward the main reflecting surface 114. E.g., filter 132 may transmit light 102 of channel $\lambda_2$ toward the channel port 122 and reflect the remaining light back toward the main reflective surface 114. Filter 133 may transmit light 103 of channel $\lambda_3$ toward the channel port 123 and reflect light 104 of the remaining wavelength channel $\lambda_4$, to be transmitted by the filter 134 toward the channel port 124 after a third bounce off the main reflective surface 114. In some implementation the common port 125 may be a microlens configured to focus the light beam 105, e.g., to a location "F" of the second bounce off the main reflective surface (Gaussian Beam Waist), to approximately balance output channel beams 101-104 with respect to the working distance (WD).

The optically assembly 100 may operate as a wavelength multiplexer, to multiplex light of individual wavelength channels separately projected by the optical ports 121 to 124 upon the optical filters 131 to 134, respectively. In this mode, a light beam (e.g. 101, 102, 103, or 104) of any one of the wavelength channels $\lambda_1$, $\lambda_2$, $\lambda_3$, and $\lambda_4$ projected upon a corresponding one of the optical filters 131, 132, 133, and 134 is transmitted through said optical filter and passed onto the common port 125 by successful reflections from the first and second angled reflection surfaces 115 and 113. The wavelength channels $\lambda_2$, $\lambda_3$, and $\lambda_4$ entering through corresponding ones of the optical filters 132, 133, and 134 are directed first toward the second angled reflective surface 115 along a zig-zag route by reflections from the main reflection surface 114 and one or more of the other optical filters 131-133.

Figure 4:
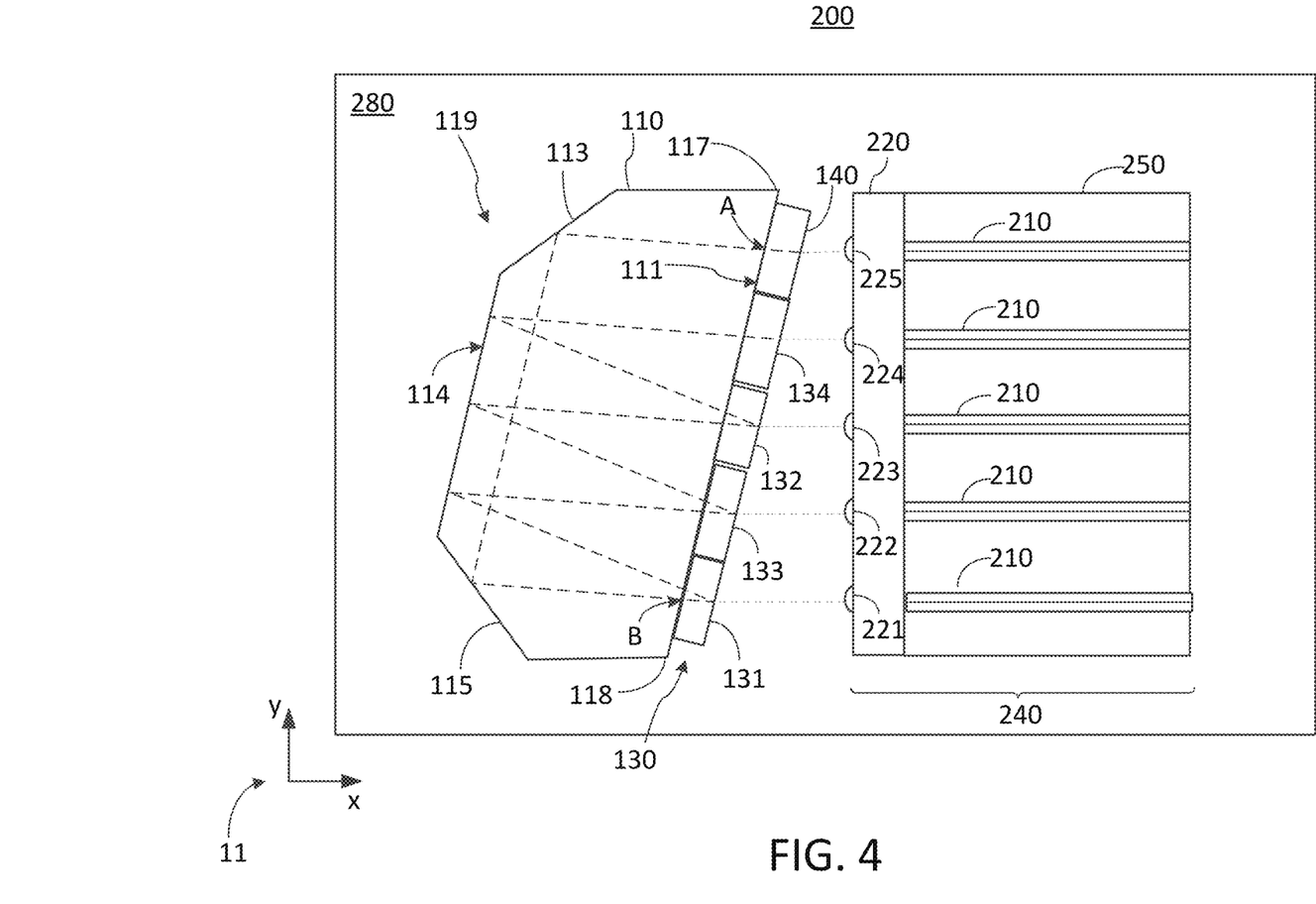
FIG. 4 is a schematic diagram illustrating an optical assembly including the RRZ block of FIG. 3 and an optical ports assembly mounted on a platform.

FIG. 4 illustrates, in a plan view, an optical assembly 200 that includes the RRZ block 110 and an optical port assembly 240 mounted on a platform 280 with a desired relative tilt. The optical port assembly 240 includes a microlens array 220 and a fiber support block 250, which may be abutting the lens array 220 at a side thereof distal from the RRZ block 110. The microlens array 220 includes channel microlenses 221, 222, 223, 224, and a common-port microlens 225. The microlens array 220 may be an embodiment of the optical port assembly 120. The channel microlenses 221, 222, 223, 224 may be embodiments of the channel optical ports 121, 122, 123, 124, respectively, with the common-port microlens 225 being an embodiment of the common port 125. The fiber support block 250 may be configured to support an array of (N+1) optical fiber ports (i.e. strands of optical fiber, e.g., 310, FIG. 5) optically coupled to the respective microlenses 121-125. In some implementations, the fiber support block 250 may have an array of fiber channels 210, e.g. grooves or vias, for holding the optical fibers of the optical fiber array in optical alignment with corresponding microlenses 225 to 221. In some implementations the lens array 220 may be attached, e.g., bonded or glued, to the fiber support block 250. The fiber support block 250 may comprise, for example, silica, silicon, borosilicate glass, or other suitable materials. The platform 280 preferably comprises a material having a similar thermal expansion coefficient as the material of the RRZ block 110 and the optical port assembly 240, such as but not limited to invar and kovar.

Figure 5:
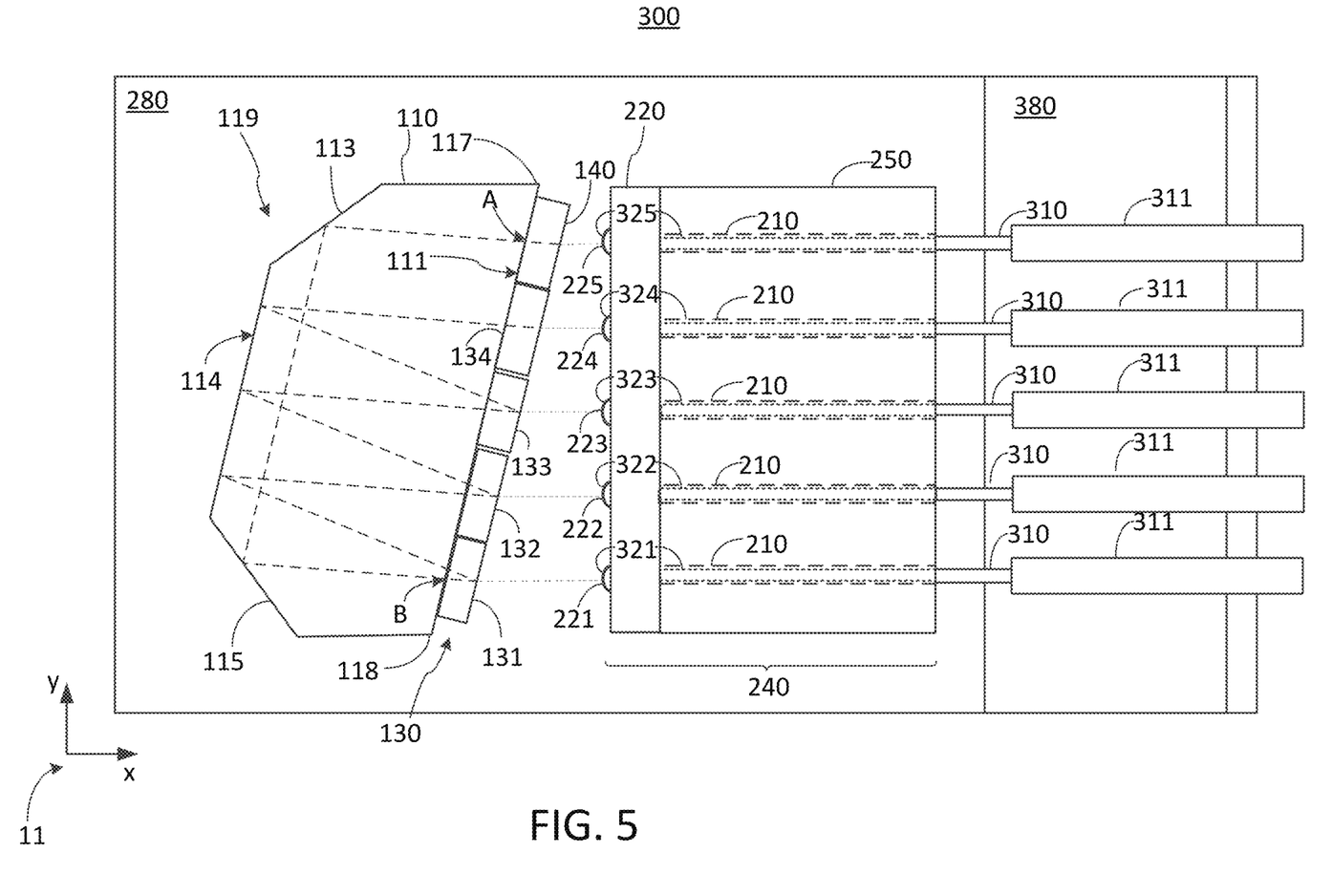
FIG. 5 is a schematic diagram illustrating a WDM device including the optical assembly of FIG. 4 and an array of optical fiber ports.

FIG. 5 illustrates, in a plan view, an optical assembly 300 ("WDM device 300") that includes the optical assembly 200 of FIG. 4 and an array of optical fibers 310. End fiber segments of the optical fibers 310 are disposed in the fiber channels 210 so as to be optically aligned and coupled to corresponding microlenses 221-225, forming corresponding optical fiber ports 321, 322, 323, 324, and 325. Each of the optical fiber ports 321-325 includes a corresponding one of the microlenses 221-225 at an end thereof facing the RRZ block 110. In some implementations, e.g. in the example illustrated in FIG. 5, the optical assembly 300 further includes a second fiber support block 380 for supporting parts of the optical fibers 310 projecting from the fiber support block 250. The end fiber segments of the optical fibers 310 held in the fiber channels 210 may be stripped of their respective jackets 311. In FIG. 5, the fiber channels 210 within the fiber support block 250 are indicated by dashed lines, with the optical fibers 310 held in those channels shown by doted lines.

Figure 6:
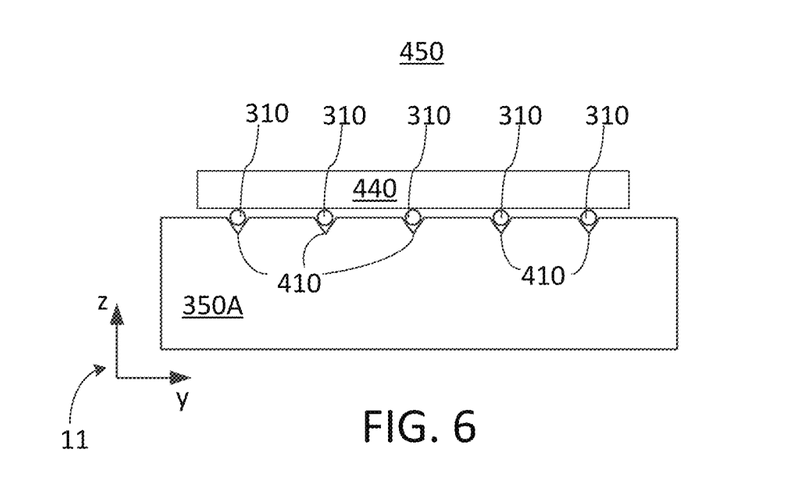
FIG. 6 is a schematic front view of an example fiber support block for supporting a linear array of optical fibers.

FIG. 6 illustrates a vertical cross-section of an example fiber support block 450, which is one possible embodiment of the fiber support block 250 of FIGS. 4 and 5. In this example, the fiber support block 450 includes a substrate 350A having an array of fiber holding grooves 410, e.g., v-grooves, with the optical fibers 310 positions therein. The fiber holding grooves 410 may be an example of the fiber channels 210. The optical fibers 310 may be held within the grooves 410 by a cover plate or cap 440, which may be affixed, e.g. bonded or glued, to the substrate 350A.

A single RRZ block 110 of the present disclosure may be used to perform parallel wavelength multiplexing and demultiplexing in two or more planes or layers and may be coupled to two or more linear, single-plane optical fiber arrays by two or more linear, one-dimensional (1D) lens array or one or more two-dimensional (2D) lens arrays.

Figure 7:
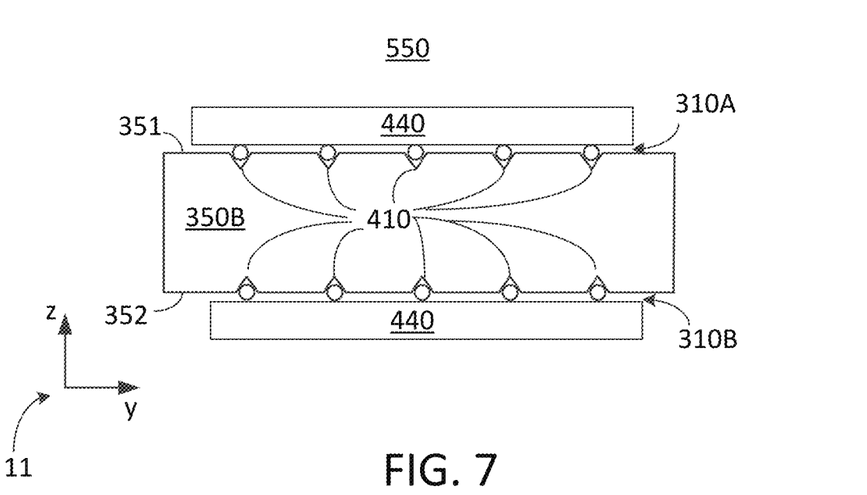
FIG. 7 is a schematic front view of an example fiber support block for supporting two linear arrays of optical fibers.

FIG. 7 illustrates a vertical cross-section of an example fiber support block 550 that may be used as the fiber support block 250 of the WDM device 300 in some embodiments. The fiber support block 550 includes a substrate 350B having arrays of fiber-holding groves 410 at opposite surfaces 351, 352 thereof. In the example of FIG. 7, the grooves 410 at opposite sides of the fiber support block 350B have two 1D optical fiber arrays 310A and 310B positioned therein, each of the two fiber arrays 310A and 310B being held in the grooves by a corresponding cover plate 440.

Figure 8A:
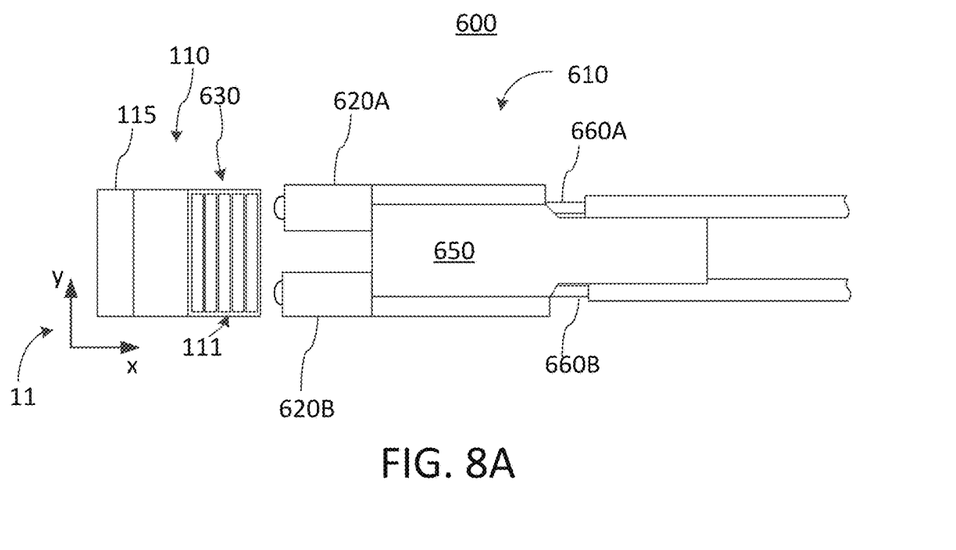
FIG. 8A is a schematic side view of an example dual-plane WDM device including an RRZ block.
Figure 8B:
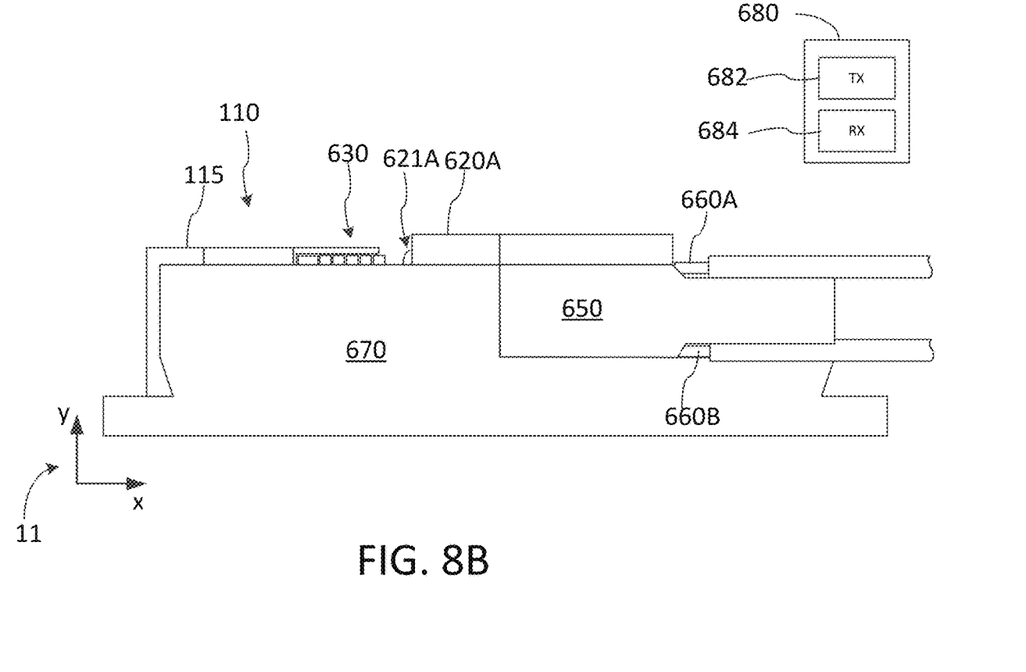
FIG. 8B is a schematic side view of the dual-plane WDM device of FIG. 8A mounted on a support bench.

FIG. 8A schematically illustrates a side view of an optical assembly 600 ("WDM device 600") for parallel wavelength multiplexing and/or demultiplexing of light in two optical layers. FIG. 8B illustrates, also in a side view, the optical WDM assembly 600 disposed in an optical bench 670 for optical and mechanical stability. The optical bench 670 may be an example of the platform 280. The optical WDM assembly 600 includes an RRZ block 110, an optical filter array 630, and a double-stacked ("dual-layer") optical port assembly 610. The optical filter array 630 may be an example of the optical filter array 130 described above. The optical port assembly 610 includes a stacked pair of 1D lens arrays 620A, 620B abutting a fiber support block 650 that holds two 1D fiber arrays 660A and 660B, e.g., as described above with reference to the fiber support block 550 and the fiber arrays 310A and 310B (FIG. 7). The filter array 630 is disposed at the port facing face 111 of the RRZ block 110 facing the double stacked lens arrays 620A and 620B. Each of the 1D lens arrays 620A, 620B may be an example of the lens array 220 described above. Each of the lens arrays 620A and 620B optically couples a corresponding one of the optical fiber array 660A and 660B with the RRZ block 110 for in-plane wavelength multiplexing and demultiplexing, as described above with reference to FIGS. 3, 4 and 5. The optical fiber arrays 660A and 660B are thus optically coupled to the same filter array 630 in different planes. In some implementations, the number of microlenses in each of the lens arrays 620A, 620B may be equal to the number N of different optical filters in the filter array 130 plus at least one additional microlens for porting multiplexed light.

The optical assembly 600 may be used, e.g., as a shared wavelength Mux/DeMux unit of an optical WDM transceiver (e.g., 680, FIG. 8B), wherein one of the optical fiber arrays 660A, 660B is connected to demultiplex optical signals received by an optical receiver unit (e.g., RX 684, FIG. 8B) of the optical WDM transceiver 860, and the other of the optical fiber arrays 660A, 660B is connected to wavelength-multiplex optical channels generated by an optical transmitter unit (e.g., TX 682, FIG. 8B) of the optical WDM transceiver 680.

Figure 9:
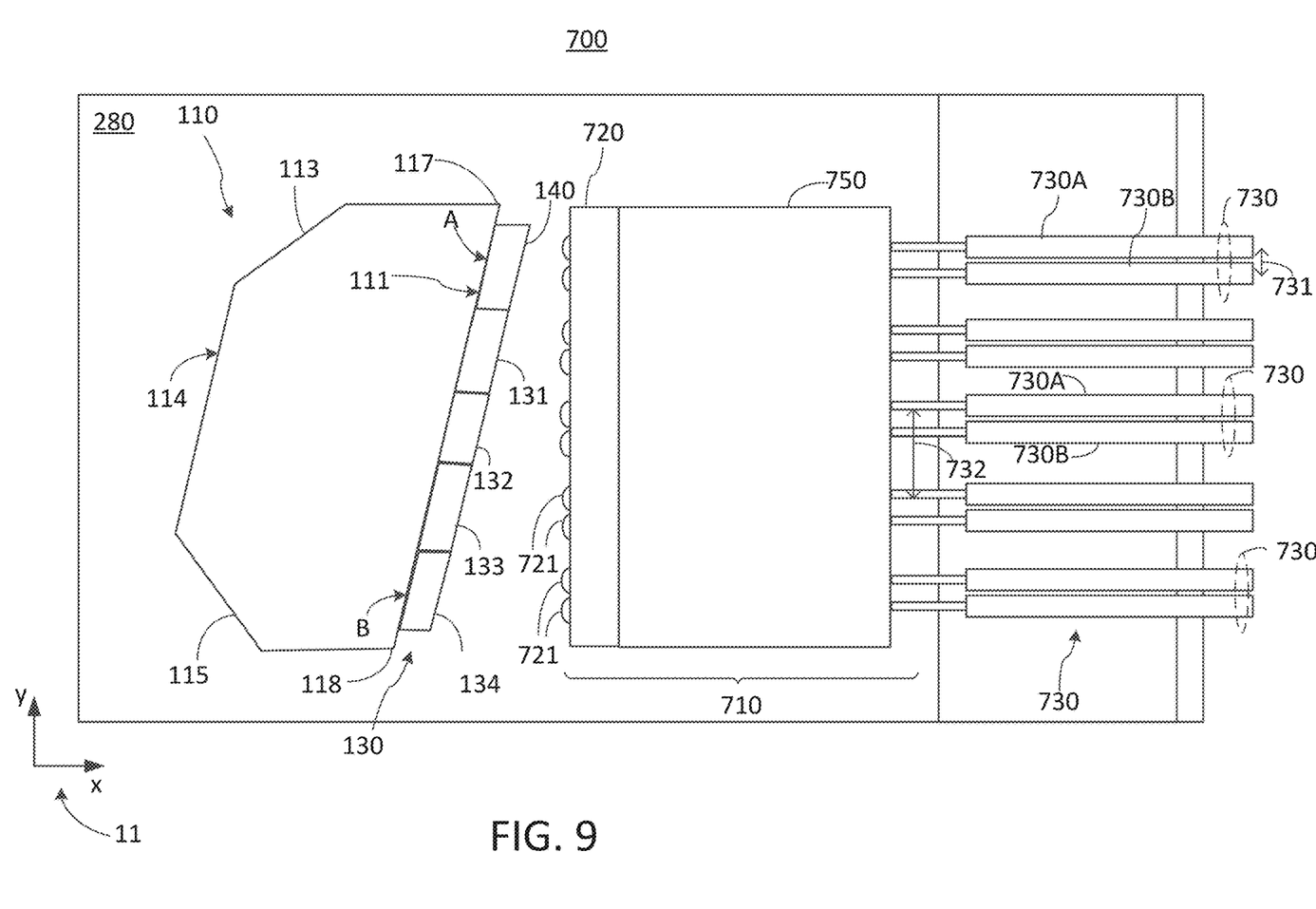
FIG. 9 is a schematic plan view of a WDM device including an RRZ block coupled to a linear array of dual optical fiber ports.

FIG. 9 illustrates a plan view of an optical assembly 700, which may be an embodiment of the optical assembly 600. The optical assembly 700 may also be a modification of the optical assembly 300 with twice as many optical fibers in the same plane. The optical assembly 700 includes an optical ports assembly 710 having (N+1) dual collimated optical fiber ports 730 in one optical plane or layer. In the example illustrated in FIG. 9, N=4. Each dual collimated optical fiber port 730 includes a pair of optical fibers 730A, 730B coupled to a pair 721 of microlenses of a lens array unit 720. The lens array unit 720 includes (N+1) microlens pairs 721, N of the microlens pairs 721 being optically aligned with corresponding N filters of the filter array 130, so that different microlens pairs are aligned with different optical filters. The optical assembly 700 may be used, e.g., for a dual optical WDM transceiver having two N-channel WDM transmitters and two N-channel WDM receivers. By way of example, for embodiments with optical fibers having an outer diameter of 125 μm, the dual collimated optical ports 730 may be disposed with a pitch 732 of approximately 750 μm, which may also be approximately equal to the pitch of the filter array 130; the distance 731 between cores of the pairs of optical fibers 730A and 730B in this example may be approximately 300 μm.

Figure 10:
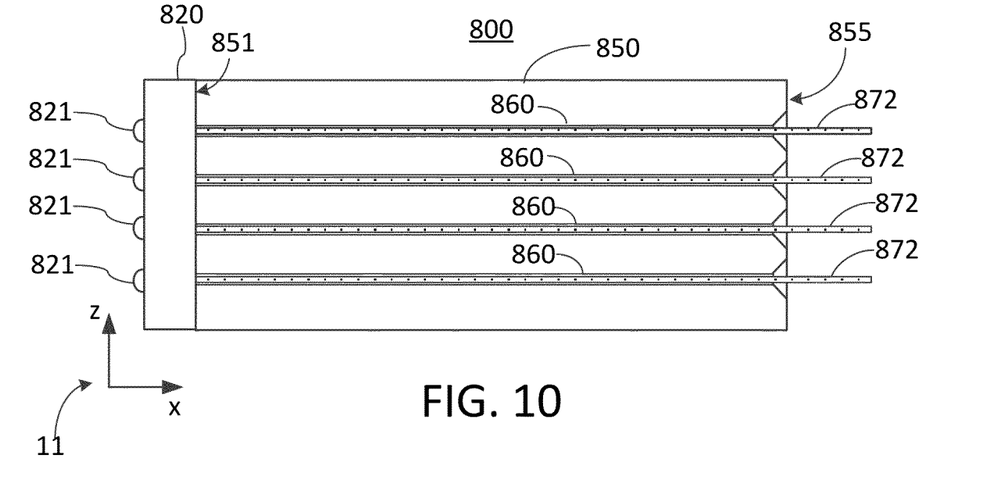
FIG. 10 is a schematic cross-sectional side view of an optical port assembly including a fiber support block having a multi-row array of fiber-holding vias.
Figure 11:
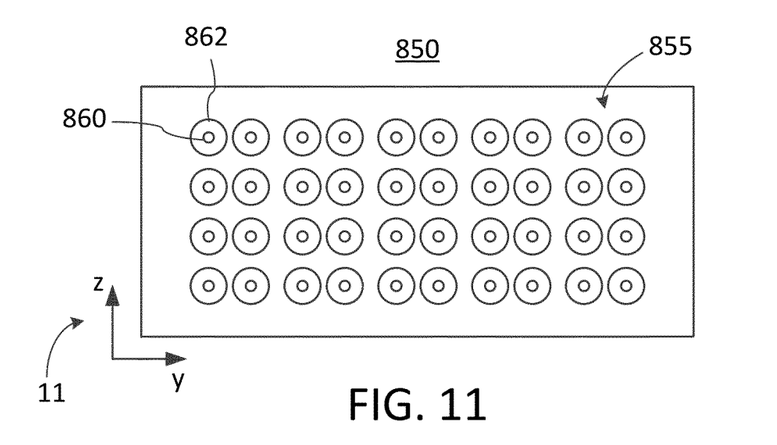
FIG. 11 is a schematic diagram of a back face of the fiber support block of FIG. 10.
Figure 12:
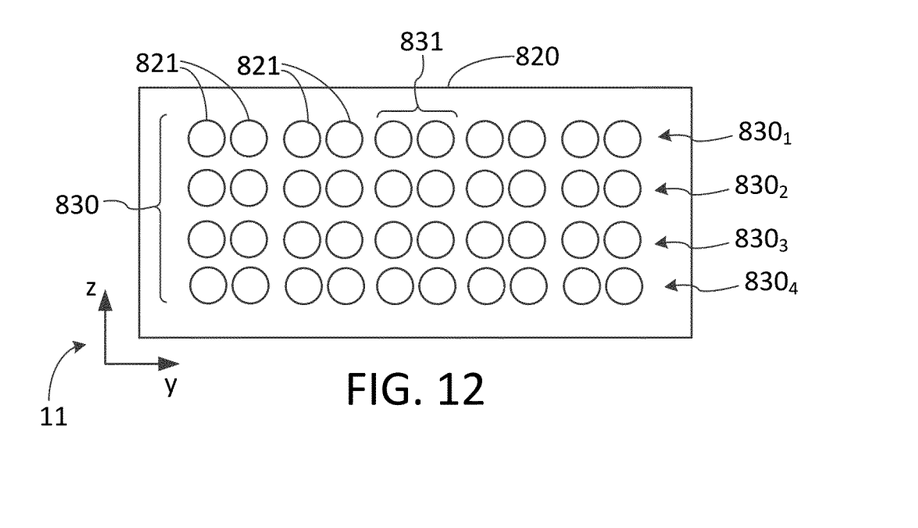
FIG. 12 is a schematic front view of a 2D lens array of the optical port assembly of FIG. 10.

Referring now to FIGS. 10-12, the port density of an optical multiplexing/demultiplexing assembly of the present disclosure may be further increased by combining the RRZ block 110, or a variant thereof, with a two-dimensional (2D) multi-layer optical port arrangement wherein a 2D lens array is paired with a fiber support block holding a corresponding 2D array of optical fibers.

FIGS. 10-12 illustrate an example multi-layer optical port assembly 800 that may be used in embodiments of the present disclosure, e.g. in place of the optical port assembly 610 of the WDM device 600 illustrated in FIGS. 8A and 8B or the optical port assembly 710 of the WDM device 700 of FIG. 9. The optical port assembly 800, which lengthwise vertical cross-section is shown in FIG. 10, includes a fiber support block 850 and a lens array unit 820 attached to a front face 851 of the fiber support block 850. The fiber support block 850 has a 2D array of lengthwise extending fiber channels 860 ("vias 860") for holding a corresponding 2D array of optical fibers 872 therein. The lens array unit 820 (FIG. 12) includes a 2D array 830 of microlenses 821 optically aligned with corresponding optical fibers 872 to form fiber-optic ports of the WDM device. In the illustrated example, the support block 850 includes four rows of the vias 860, each housing a linear array of optical fibers 872 optically aligned with respective microlenses 821 of a corresponding row, or linear array, $830_1$, $830_2$, $830_3$, or $830_4$ of the microlenses 821 in the 2D microlens array 830. The vias 860 may be provided with fiber-guiding chamfers 862 at a back face 855 of the fiber support block 850 for threading optical fibers therethrough.

FIGS. 11 and 12 show the back face 855 of the fiber support block 850 and a corresponding lens array unit 820 (front view) for an example "dual ports in one plane" implementation illustrated in FIG. 9. In this implementation, each row of microlenses 821 includes (N+1) microlens pairs 831, with N=4 in the illustrated example. In a final WDM assembly, all but one of said microlens pair 831 may be aligned with a corresponding optical filter (e.g., 131, 132, 133, or 134) of the filter array (e.g., 130, not shown in FIGS. 11 and 12) to optically couple said filter to a corresponding pair of the optical fibers 872, e.g. as described above with reference to FIG. 9. In this example, a single optical port assembly 800 paired with one RRZ block 110 of a suitable height may support wavelength multiplexing and demultiplexing requirements of eight 4-channel optical WDM transceivers on both the Rx and Tx sides thereof.

The examples of optical assemblies described above are not intended to be limiting, and many variations will become apparent to a skilled reader having the benefit of the present disclosure. For example, the above-described optical assemblies may be modified for multiplexing and de-multiplexing more than four different wavelength channels, e.g., by increasing the number N of different optical filters in the optical filter array 130 or 630 and possibly increasing the width of the RZZ block. Similarly, multilayer implementations may include a different number of port layers, e.g., from one to ten or more, which may be limited by a device height specification and a degree of beam collimation.

One or more examples described above, e.g. in the summary section and with reference to any one or more of the FIGS. 1-12, provide an optical assembly for demultiplexing wavelength channels (e.g., 100, FIG. 3; 200, FIG. 4; 300, FIG. 5; 600, FIGS. 8A, 8B; 700, FIG. 9). The optical assembly comprises an optical port assembly (e.g., 120, FIG. 3; 240, FIGS. 4, 5; 610, FIG. 8A; 710, FIG. 9) comprising an array (e.g., 160, FIG. 3) of optical ports (e.g., 121-125, FIG. 3; 221-225, FIG. 4; 321-324, FIG. 5). The optical assembly further comprises a retro-reflecting Z-block ("RRZ block", e.g. 110, FIG. 3-5,8A, 8B, 9) of optically transmissive material and an array (e.g., 130, FIGS. 3-5 and 9; 630, FIGS. 8A, 8B, 9) of optical filters (e.g., 131-134, FIGS. 3-5 and 9). The retro-reflecting Z-block comprises a port facing face (e.g., 111) and a back face (e.g., 119, FIGS. 3-5). The optically transmissive material of the retro-reflecting Z-block may be optically transparent. The optical filters are located along the port facing face (e.g, in sequence one after another adjacent to or abutting a corresponding sequence of surface areas of the port facing face) in an optical alignment with respective ones of the optical ports. The optical filters are configured to selectively transmit light of corresponding wavelength channels. The back face of the RRZ block comprises a main reflective surface (e.g., 114, FIGS. 3-5, 9) between first and second angled reflective surfaces (e.g., 113 and 115, FIGS. 3-5, 9), said first and second angled reflective surfaces together forming a retro-reflector (e.g., 150, FIG. 3) for light (e.g., 105, FIG. 3) entering the retro-reflective Z-block via a first optical port (e.g., 125, FIGS. 3-5 and 9) of the array of optical ports.

In some implementations, the RRZ block may be configured to direct light entering the RRZ block from the first optical port to each of the optical filters (e.g., 131-134, FIGS. 3-5) starting with one of the optical filters (e.g., 131, FIGS. 3-5) optically aligned with one of the optical ports (e.g. 121) at an opposite end of the array 160 of optical ports from the first optical port (e.g., 125).

In any of the above implementations, the first optical port (e.g., 125, FIGS. 3, 4; 325, FIG. 5) may be a common port configured to project wavelength multiplexed light (e.g., 105, FIG. 3) upon the first angled reflective surface bypassing the optical filters. The first angled reflective surface may be configured to direct the wavelength multiplexed light along the main reflective surface toward the second angled reflective surface. Filtered portions of the wavelength multiplexed light (e.g., 105) may be directed toward some of the optical filters (e.g., 132-134) by reflections from the main reflective surface.

In any of the above implementations, the array of optical ports may further comprise a plurality of channel ports (e.g., 121-124, FIGS. 3, 4; 321-324, FIG. 5); the RRZ block may be configured to direct light entering the RRZ block from any one of the channel ports toward the common port after a reflection by each of the first and second angled reflectors.

In any of the above implementations, the main reflective surface may be parallel to the port facing face of the RRZ block.

In any of the above implementations, the array of optical ports may comprise an array of microlenses (e.g. 220, FIGS. 4, 5; 830, FIG. 12), each of the optical ports comprising a corresponding microlens of the array of microlenses.

In any of the above implementations, the retro-reflecting Z-block may be tilted by at least 8 degrees relative to the array of microlenses.

In any of the above implementations, the optical ports assembly may further comprise a fiber support block (e.g., 250, FIGS. 4,5; 450, FIG. 6; 550, FIG. 7; 650, FIGS. 8A, 8B; 710, FIG. 9; 850, FIGS. 10,11) configured to support an array of optical fibers optically coupled to corresponding ones of the microlenses. In some implementations, the array of microlenses may comprise two vertically stacked arrays of microlenses (e.g. 620A, 620B, FIG. 8A; $830_1$ and any one of $830_2$, $830_3$, and $830_4$, FIG. 12) comprising pairs of microlenses commonly aligned to corresponding ones of the optical filters. In some of such implementations, the fiber support block may comprise two opposing faces (e.g., 351, 352, FIG. 7), each of the two opposing faces having an array of fiber supporting grooves (e.g., 410, FIG. 7).

In any of the above implementations of the optical assembly for demultiplexing N≥2 wavelength channels (e.g., 600, FIGS. 8A, 8B; 900?, FIG. 9) that comprises an array of microlenses, the array of optical filters (e.g. 130, FIGS. 3-5, 9; 630, FIG. 8A) may comprise a sequence of N optical filters, and the array of microlenses (e.g., 830, FIG. 12) may comprise (N+1) pairs of microlenses (e.g., 831, FIG. 12), some of the pairs being optically aligned with corresponding optical filters. In some of such implementations (e.g., FIGS. 9 and 12), the (N+1) pairs of microlenses are aligned in a plane (e.g., the plane of any one of the 1D lens arrays $830_1$, $830_2$, $830_3$, and $830_4$, FIG. 12).

In any of the above implementations that comprises an array of microlenses, the array of microlenses may comprise a 2D array of the microlenses (e.g., 830, FIG. 12), and the fiber support block may comprise a 2D array of longitudinally extending channels (e.g., 860, FIGS. 10, 11) to support a 2D array of optical fibers in optical alignments with corresponding ones of the microlenses (e.g., 821, FIG. 12) of the 2D array of microlenses.

Any of the above implementations may further comprise a platform (e.g., 280, FIGS. 4, 5, and 9; 670, FIG. 8B) upon which the retro-reflecting Z-block and the optical port assembly are mounted.

In any of the above implementations, the array of optical filters may comprise thin-film optical filters sequentially disposed upon the port-facing face of the RZZ block.

One or more examples described above, e.g. in the summary section and with reference to any one or more of the FIGS. 1-12, provide an optical assembly for demultiplexing wavelength channels. The optical assembly comprises an RRZ block (e.g. 110, FIG. 3-5,8A, 8B, 9) of optically transmissive material comprising a port facing face (e.g., 111, FIGS. 3-5) and a back face (e.g., 119, FIGS. 3-5), and an array (e.g., 130, FIGS. 3-5 and 9; 630, FIGS. 8A, 8B, 9) of optical filters (e.g., 131-134, FIGS. 3-5 and 9), e.g., thin-film optical filters, sequentially disposed upon the port facing face for receiving light (e.g., 105, 104, 103, 102, and/or 101, FIG. 3) from an array of optical ports (e.g., 121-125, FIG. 3; 321-325, FIG. 3). The optical filters are configured to selectively transmit light of corresponding wavelength channels. The back face of the RRZ block comprises a main reflective surface (e.g., 114, FIGS. 3-5, 9) between first and second angled reflective surfaces (e.g., 113 and 115, FIGS. 3-5, 9), said first and second angled reflective surfaces together forming a retro-reflector (e.g., 150, FIG. 3) for light (e.g., 101, 102, 103, 104, or 105, FIG. 3) entering the retro-reflective Z-block. Some implementations may include an optical port assembly (e.g., 120, FIG. 3; 240, FIGS. 4, 5; 610, FIG. 8A; 710, FIG. 9) comprising the array of optical ports.

Unless explicitly stated otherwise, each numerical value and range should be interpreted as being approximate as if the word "about" or "approximately" preceded the value or range.

It will be further understood that various changes in the details, materials, and arrangements of the portions which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Furthermore in the description above, for purposes of explanation and not limitation, specific details are set forth such as particular architectures, interfaces, techniques, etc. in order to provide a thorough understanding of the present disclosure. In some instances, detailed descriptions of well-known devices, circuits, and methods are omitted so as not to obscure the description of the present disclosure with unnecessary detail. Thus, for example, it will be appreciated by those skilled in the art that block diagrams herein can represent conceptual views of illustrative circuitry embodying the principles of the technology. All statements herein reciting principles, aspects, and embodiments of the disclosure, as well as specific examples thereof, are intended to encompass both structural and functional equivalents thereof.

Thus, while the present disclosure has been particularly shown and described with reference to example embodiments as illustrated in the drawing, it will be understood by one skilled in the art that various changes in detail may be affected therein without departing from the spirit and scope of the disclosure as defined by the claims.

The invention claimed is:

1. An optical assembly for demultiplexing wavelength channels, the optical assembly comprising:
   an optical port assembly comprising an array of optical ports;
   a retro-reflecting Z-block of optically transmissive material comprising a port facing face and a back face; and
   an array of optical filters located along the port facing face in an optical alignment with respective ones of the optical ports, wherein the optical filters are configured to selectively transmit light of corresponding wavelength channels;
   wherein the back face of the retro-reflecting Z-block comprises a main reflective surface between first and second angled reflective surfaces, said first and second angled reflective surfaces together forming a retroreflector for light entering the retro-reflective Z-block via a first optical port of the array of optical ports,
   wherein the retro-reflecting Z-block is configured to direct light entering the retro-reflecting Z-block from the first optical port to each of the optical filters starting with one of the optical filters optically aligned with one of the optical ports at an opposite end of the array of optical ports from the first optical port.

2. The optical assembly of claim 1, wherein the first optical port is a common port configured to project wavelength multiplexed light upon the first angled reflective surface bypassing the optical filters.

3. The optical assembly of claim 2 wherein the first angled reflective surface is configured to direct the wavelength multiplexed light along the main reflective surface toward the second angled reflective surface, and wherein filtered portions of the wavelength multiplexed light are directed toward some of the optical filters by reflections from the main reflective surface.

4. The optical assembly of claim 2, wherein the array of optical ports comprises a plurality of channel ports, and wherein the retro-reflecting Z-block is configured to direct light entering the retro-reflecting Z-block from any one of the channel ports toward the common port after a reflection by each of the first and second angled reflective surfaces.

5. The optical assembly of claim 1 wherein the main reflective surface is parallel to the port facing face of the retro-reflecting Z block.

6. The optical assembly of claim 1 wherein the array of optical ports comprises an array of microlenses, each of the optical ports comprising a corresponding microlens of the array of microlenses.

7. The optical assembly of claim 6 wherein the retro-reflecting Z-block is tilted by at least 8 degrees relative to the array of microlenses.

8. The optical assembly of claim 6 wherein the optical ports assembly further comprises a fiber support block configured to support an array of optical fibers optically coupled to corresponding ones of the microlenses.

9. The optical assembly of claim 6 wherein the array of microlenses comprises two vertically stacked arrays of microlenses, the two vertically stacked arrays of microlenses comprising pairs of microlenses commonly aligned to corresponding ones of the optical filters.

10. The optical assembly of claim 6 for demultiplexing $N \geq 2$ wavelength channels, wherein the array of optical filters comprises a sequence of N optical filters, and wherein the array of microlenses comprises (N+1) pairs of microlenses, some of the pairs being optically aligned with corresponding optical filters.

11. The optical assembly of claim 10 wherein the (N+1) pairs of microlenses are aligned in a plane.

12. The optical assembly of claim 8 wherein the fiber support block comprises two opposing faces, each of the two opposing faces having an array of fiber supporting grooves.

13. The optical assembly of claim 8 wherein the array of microlenses comprises a 2D array of the microlenses, and wherein the fiber support block comprises a 2D array of longitudinally extending channels to support a 2D array of optical fibers in optical alignments with corresponding ones of the microlenses of the 2D array of microlenses.

14. The optical demultiplexer of claim 1 further comprising a platform upon which the retro-reflecting Z-block and the optical port assembly are mounted.

15. The optical demultiplexer of claim 1 wherein the array of optical filters comprises thin-film optical filters sequentially disposed upon the port facing face of the retro-reflecting Z-block.

16. The optical demultiplexer of claim 1 wherein the optically transmissive material is optically transparent.

* * * * *